United States Patent Office 3,047,016
Patented July 31, 1962

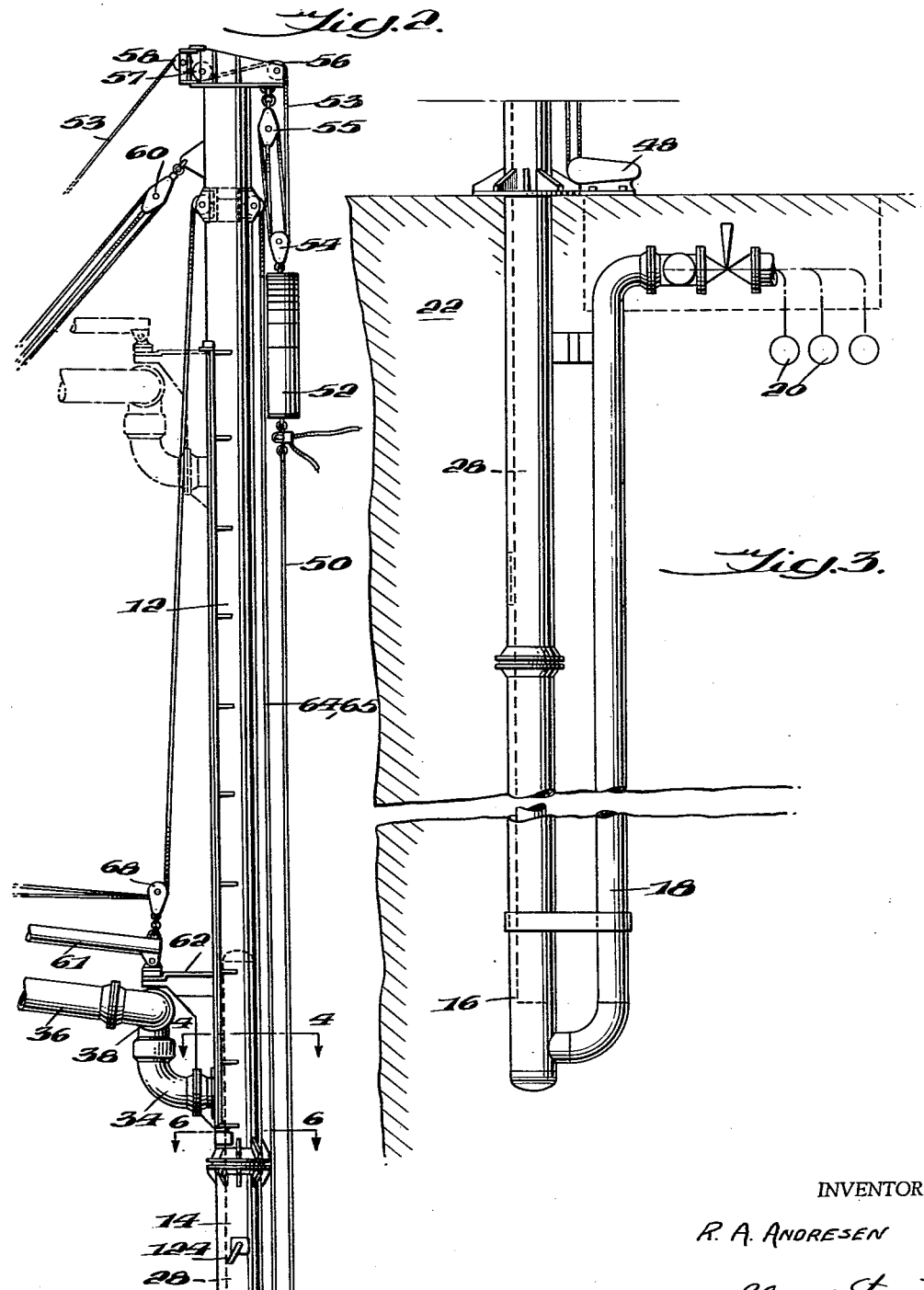

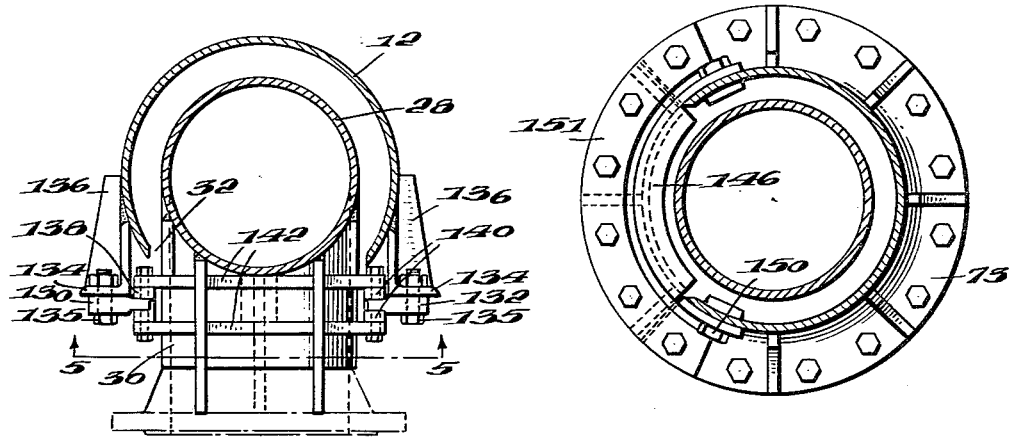
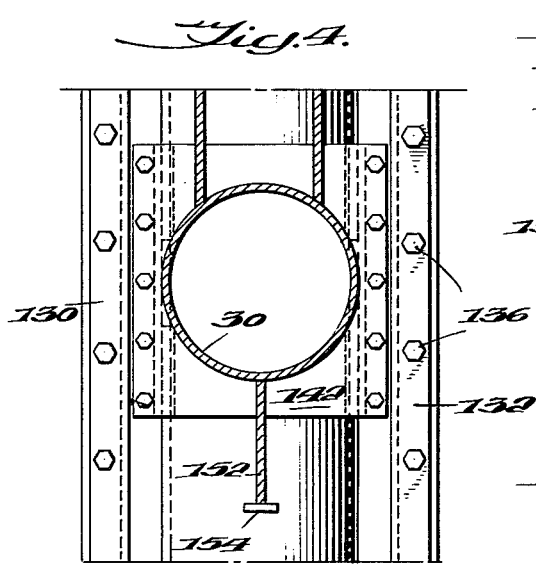
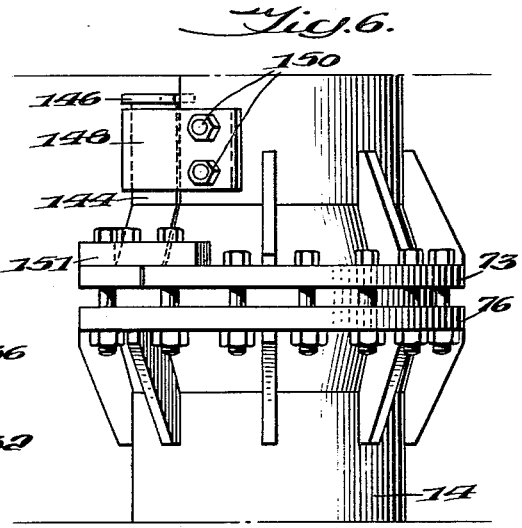

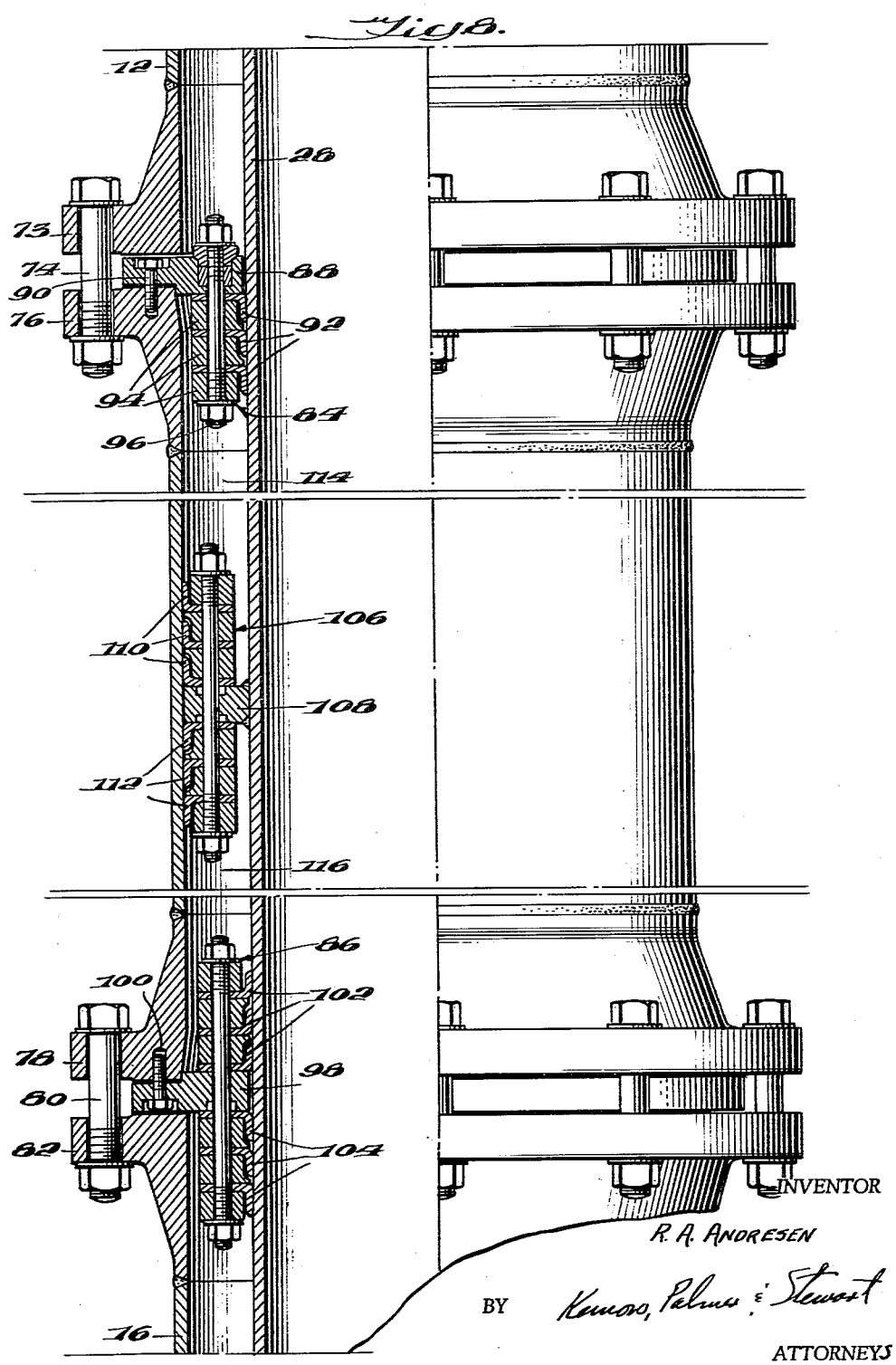

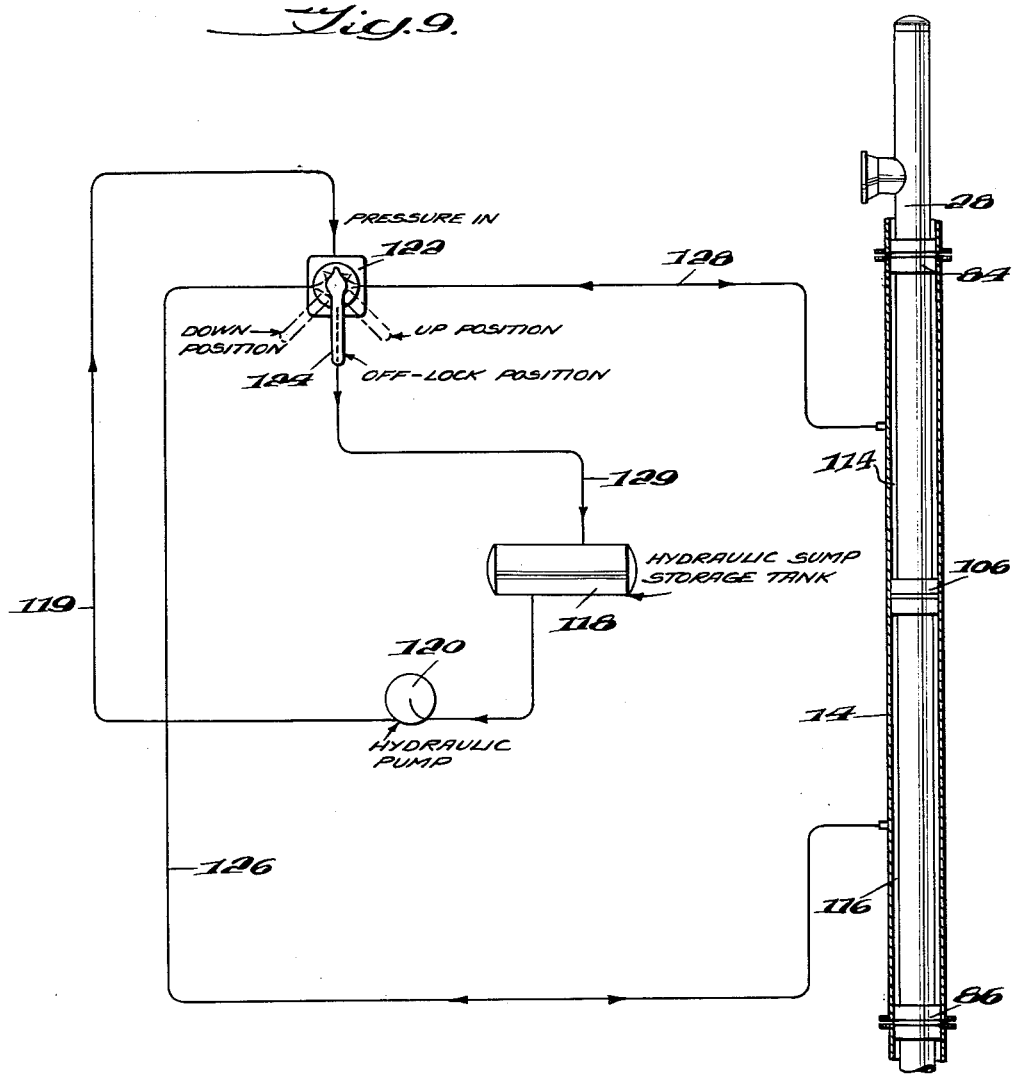

3,047,016
MARINE LOADING AND UNLOADING
APPARATUS
Raymond A. Andresen, 55 Lincoln Ave.,
Port Chester, N.Y.
Filed May 27, 1960, Ser. No. 32,341
4 Claims. (Cl. 137—615)

This invention relates to marine loading and unloading apparatus. More particularly, it relates to a fluid loading and unloading apparatus mountable on a wharf, jetty, dolphin, or other marine structure for use in loading and unloading such floating vessels as ships, tankers, or barges.

In marine installations of the type adapted to transfer fluids to and from ships, tankers, barges, or other floating vessels, a severe problem is encountered due to the many and varied positions assumed by a vessel on the water, and particularly, loading manifold couplings thereon to which shore installed fluid conduit means must be connected. Although there are many reasons for this problem, perhaps the principal cause is the continuously changing level of a vessel in the water during loading and unloading operations due to the varying weight of fluid being transferred to or from the vessel at these times. The position of the loading manifold coupling to which a shore mounted conduit must be attached, however, will be varied due to other causes such as tides, the many diverse types of vessels which must be accommodated, among others.

To overcome the problem of changing positions of a floating vessel with respect to an immovable, on-shore, marine loading and unloading installation, designers and builders of such installations have developed various types of flexible conduits which may be coupled between ships, tankers, or barges and on-shore installations to establish fluid connections which will adjust to various vessel positions and elevations. For the most part, these flexible conduits have taken the form of either a plurality of articulated pipe sections coupled by universal joints or flexible hoses. In either case, because of the size conduits necessary for efficient loading and unloading operations, they constitute a substantial weight which must be supported from appropriate means on shore. Furthermore, in loading and unloading apparatus of this type heretofore available, the extreme vertical positions of the vessel and loading manifold coupling thereon have been reached only by increasing the overall lengths of the conduits and correspondingly requiring elaborate on-shore structural installations to adequately support the conduits so as not to impose too great a load on the conduits and couplings. As a result, fluid handling marine installations of the type to which this invention relates, heretofore known have been either exceedingly complex, cumbersome and extremely expensive or have been inadequate for their intended purpose.

Accordingly, an object of this invention is to provide a new and unique fluid loading and unloading apparatus for floating vessels by which the problems aforementioned are effectively and substantially overcome.

Another object of this invention is that of providing a marine loading and unloading apparatus of the type referred to which is easily supported on a wharf, dock, jetty, dolphin, or other on-shore installation without requiring elaborate super structures for effective support and yet which is adaptable to an extremely wide range of loading and unloading conditions.

A further object of this invention is the provision of an on-shore fluid loading and unloading apparatus for floating vessels which is easily and effectively adjusted to accommodate various levels of the vessel which may be encountered during loading and unloading operations or to accommodate diverse types of vessels under all tide conditions.

Still another object of this invention is that of providing an apparatus of the type referred to which is exceptionally strong and yet which presents an exceedingly uncluttered on-shore structure which is relatively inexpensive as compared to apparatus of this type heretofore available.

Other objects and further scope of applicability of the present invention will be apparent from the detailed description given hereinafter. It should be understood, however, that the detailed description, while indicating preferred embodiments of this invention, is given by way of illustration only since it will be made apparent to those skilled in the art that various changes and modifications can be made without departing in any way from the true spirit and scope of this invention.

In general, the aforementioned objects are accomplished by providing an upright tubular mast suitably anchored at its lower end in a dock, wharf, jetty, dolphin, or the like and in fluid communication with a shore installation through a pipe connected to its lower end. The mast carries internally, a slidable conduit provided at its upper end with a coupling attached to conduit means for establishing a fluid connection with a floating vessel, which coupling extends through an elongated opening in the seaward side of the mast. Further, a seal arrangement is provided between the mast and the slidable conduit so as to establish a pair of expansible chambers arranged to be fed with working fluid under pressure to move the conduit to various vertical positions with respect to the mast and thereby to facilitate connection to a coupling carried on the vessel regardless of the position thereof with respect to the shore.

A more complete understanding of the new and improved marine loading and unloading apparatus of this invention and its operation may be had by reference to the accompanying drawings in which:

FIG. 2 is an enlarged fragmentary elevation showing the upper portion of the apparatus of this invention;

FIG. 3 is an enlarged fragmentary elevation showing the lower portion of the marine loading and loading apparatus of this invention;

FIG. 4 is an enlarged cross-sectional view taken along line 4—4 of FIG. 2;

FIG. 5 is a partial cross-section and elevation taken along line 5—5 of FIG. 4;

FIG. 6 is an enlarged cross-sectional view taken along line 6—6 of FIG. 2;

FIG. 7 is a side elevation of the mast portion illustrated in FIG. 6;

FIG. 8 is an enlarged fragmentary elevation in partial cross-section illustrating the seal arrangement between the mast and slidable conduit of this invention; and FIG. 9 is a schematic illustration of a hydraulic system for use with the apparatus of this invention.

Figure 1:
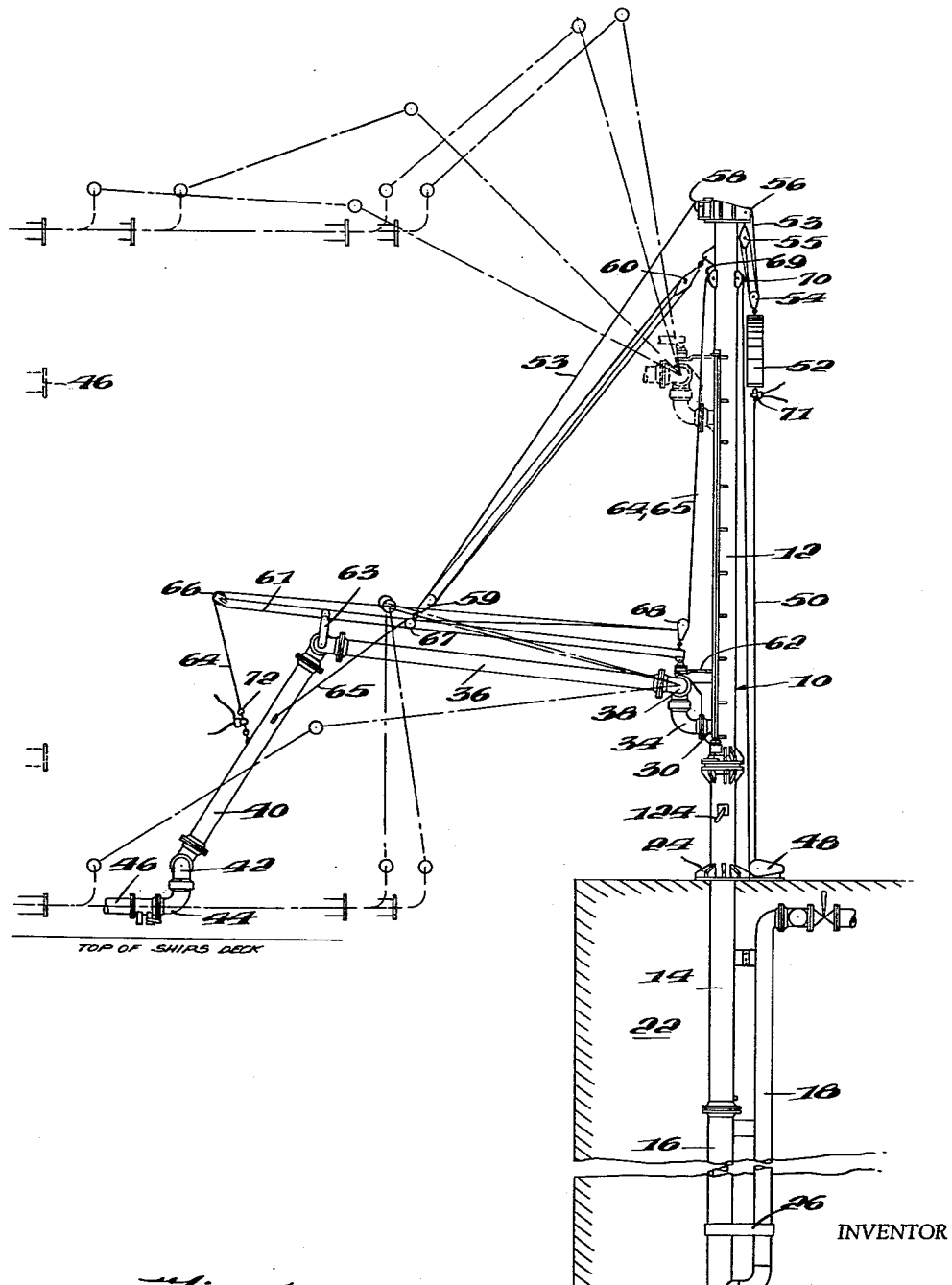
FIG. 1 is a side elevation illustrating the apparatus of this invention and its adaptability to various ship coupling positions.

As illustrated in FIGS. 1, 2, and 3 of the drawings, the apparatus of this invention includes a substantially vertical tubular mast designated generally by the numeral 10, which mast is formed having an upper section 12, a central section 14 and a lower section 16. The lower end of the mast 10 is in fluid communication with one end of a pipe 18, the other end of the pipe being connected to manifolds 20 which in turn feed to or from suitable shore installed storage facilities.

If desired, the mast 10 may be anchored in a monolithic-type dock structure 22 as illustrated in FIGS. 1 and 3 of the drawings and as will be apparent to those skilled in the art such anchorage would be sufficient to retain the mast in an upright position. It is contemplated, however, that the mast 10 may also be supported by a frame-type dock structure or one resting on piles and for this purpose, a flange like pedestal 24 is provided to support the mast in the vicinity of the dock floor while a bottom guide support 26 is carried near the lower end of the mast to which suitable bracing may be attached for anchorage to the substructure of a frame or pile-type dock, or the like.

Carried slidably within the tubular mast 10 is a fluid conduit 28 opened at its lower end to the lower section 16 of the mast and carrying at its upper end a coupling nipple 30 which extends through an elongated opening 32 in the seaward side of the mast upper section 12. The nipple 30 is connected to an upwardly directed L-shaped pipe section 34 which in turn is in fluid communication with a pipe section 36 through a universal joint 38. A second pipe section 40 is pivotally connected to the pipe section 36 and carries at its free end another universal coupling 42 to which a coupling elbow 44 is attached. The coupling elbow 44, in turn, is detachably connectable to a loading manifold coupler 46 on the vessel to be loaded or unloaded (not shown). Although the articulated pipe sections 36 and 40 as well as the joints used therewith are not, in and of themselves, part of this invention it will be noted that the universal joints 38 and 42 permit not only pivotal movement of the pipe sections about a horizontal axis but also permit such movement about a vertical axis and thereby accommodate any movement of the ship which may occur parallel to the dock face.

Support and positioning of the articulated pipe sections 36 and 40 is affected preferably by electrically actuated winches 48 (only one being shown) arranged to operate a cable system. For this purpose, one winch would be arranged to apply tension to a cable 50 connected at its free end with a counterweight 52. As shown in FIGS. 1 and 2, the counterweight 52 is supported by a cable 53 trained about blocks 54 and 55, pulleys 56, 57 and 58 at the upper end of the mast 10, and about pulley blocks 59 and 60 to support a boom 61 pivotally connected at its inboard end to a platform 62 rigidly supported at the upper end of the slidable conduit 28. A link 63 connects the boom 61 with the end of the pipe section 36 to adjust the angular position of this pipe section in a vertical plane. To adjust the angular position of the pipe section 40 with respect to the section 36, a pair of cables 64 and 65 are connected at one end to the pipe section 40, trained over pulleys 66 and 67 respectively on the boom 61 a block 68, pulleys 69 and 70 and ultimately to the winches 48. Series tension responsive switches 71 and 72 are provided on the cables 50 and 64 respectively and electrically connected to the winches 48 through means (not shown) to automatically support the articulated pipe sections 36 and 40 during loading and unloading operations in a manner which will be more clearly understood from the description of operation which follows below.

The means by which the conduit 28 may be slidably positioned vertically in the tubular mast 10 is shown most clearly in FIGS. 8 and 9 of the drawings. Referring particularly to FIG. 8, it will be noted that the upper section 12 of the mast is provided at its lower end with a flange 73 connected by bolts 74 to a flange 76 on the upper end of the central section 14. In similar fashion, a flange 78 on the lower end of the central section 14 is connected by bolts 80 to a flange 82 on the upper end of the lower section 16. In each of the flange joints thus provided at both ends of the central section 14, are mounted annular seals 84 and 86 slidably engageable, in fluid tight relation, with the slidable conduit 28. The seal 84 at the upper end of the central section 14 is formed having a mounting ring 88 which extends outwardly between the flanges 73 and 76 and may be mounted to the flange 76 such as by bolts 90. Depending from the support ring 88 are a plurality of wiper seals 92 retained between wiper support rings 94 by axially aligned bolts 96. Also, it will be noted that the wiper seals 92 are directed downwardly at their point of engagement with the conduit 28 to establish a fluid tight seal against pressures existing below the supporting ring 88.

The seal 86 is similar in construction to the seal 84 and is provided with a supporting ring 98 extending between the flanges 78 and 82 and secured to the flange 78 such as by bolts 100. In this instance, upper and lower wiper rings 102 and 104 respectively are provided and facing in opposite directions. In this manner, the lower wiper rings effectively seal off pressures existing below the ring 98 while the upwardly facing seal rings 102 effectively seal off pressures existing above this supporting ring.

Secured to the slidable conduit 28 is an annular seal 106 which, like the seals 84 and 86, is provided with a supporting ring 108 suitably affixed to the conduit 28 such as by welding. The seal 106 is provided with a plurality of upper and lower wiper rings 110 and 112 respectively which slidably engage the interior of the mast central section 14 in fluid tight relation. Thus it will be seen that the seal 106 is effective to prevent the transmission of fluids past the support ring 108 to establish an upper annular expansible chamber 114 between the seals 84 and 106 and a lower expansible annular chamber 116 between the seals 106 and 86.

A preferred system for feeding working fluid to the expansible chambers 114 and 116 and thereby effect controlled vertical movement of the conduit 28 is shown schematically in FIG. 9. This system includes a hydraulic sump storage tank 118 from which fluid is pumped through a line 119 by a pump 120 to the inlet side of a four way valve 122 having an actuating handle 124. As will be understood by those familiar with the art, when the valve is adjusted to a position designated as the "up position" in the drawing, pressurized working fluid is fed from the valve 122 through a conduit 126 and into the chamber 116. Simultaneously, fluid in the chamber 114 above the seal 106 is exhausted through a conduit 128 into the valve 122 and back to the tank 118 through a conduit 129. When the valve is moved to the down position, the direction of fluid flow in the conduits 126 and 128 is reversed such that pressurized hydraulic fluid is fed to the chamber 114 and fluid in the chamber 116 is vented to the tank 118. Also, the valve 122 is associated with suitable electric switch means (not shown) arranged in such a manner that the pump 120 will be rendered operative upon movement of the handle 124 to either the "up" or "down" position and turned off when the handle is moved to the "off-lock" position.

To support the upper end of the slidable conduit 28 in the mast 10, the upper section 12 thereof is provided with a pair of guideways 130 and 132 supported vertically adjacent the edges of the opening 32 on angle members 134 such as by bolts 135. As may be seen in FIGS. 1, 2, and 4, the angle members 134 are strengthened by gusset plates 136 spaced vertically along the upper mast section 12. The guideways 130 and 132 are slidingly received between bearing members 138 and 140 respectively bolted or otherwise secured on the facing surfaces of a pair of plates 142 welded or otherwise secured about the coupling nipple 30. Thus it will be seen that the conduit 28 is rigidly supported against lateral movement within the mast 10 on the guideways 130 and 132 throughout its range of vertical adjustment in the opening 32 of the upper mast section 12.

In order to limit the extent of downward movement of the conduit 28 within the mast 10, the lower end of the elongated opening 32 is filled by a segment 144 supporting at its upper end a bumper plate 146 as may be seen by reference to FIGS. 6 and 7 of the drawings. The segment 144 may be retained in place by being welded to a generally circular strap 148 which in turn extends past the angular extent of the opening 32 and is bolted to the upper mast section 12 such as by bolts 150. Also, an arcuate plate 151 bolted to the segment and flange 73 strengthens this connection. Referring again to FIG. 5, it will be noted that the coupling nipple 30 supports on its lower side a depending gusset plate 152 which terminates at its lower end in a horizontal bumper plate 154. Thus, it will be seen that the lowermost movement of the slidable conduit 28 is established by engagement of the bumper 154 with the bumper plate 146. In a similar manner upward movement of the slidable conduit 28 is positively limited by engagement of the platform 62 with the upper end of the opening 32.

In operation, after the vessel to be loaded or unloaded has been made fast to the dock 22, the coupling elbow 44 is brought into position adjacent the manifold coupling 46 on the ship by the combined operation of the winches 48 and the hydraulic system illustrated in FIG. 9 of the drawings. As indicated by the phantom lines in FIG. 1 of the drawings, a wide range of positions is possible and when the elbow 44 has been thus properly located it is connected to the loading manifold coupler 46 to establish fluid communication from the ship, through the articulated pipe sections 40 and 36, the sliding conduit 28, and into the lower mast section 16. Since the downwardly turned seal rings 104 of the seal 86 prevent the passage of fluid above the ring 98, the fluid being loaded or unloaded is confined to the lower mast section 16. From there, the fluid communication continues through the pipe 18, manifolds 20 and to the on-shore storage facilities fed by the manifolds. As the position of the loading manifold coupler changes with the continually varying load in the vessel during loading and unloading operations, the weight of the pipe sections 36 and 40 is carried by the winches operating automatically under the control of the series tension responsive switches 71 and 72. In this manner, very little if any force is exerted on the loading manifold coupling 46 other than that which is necessary to make a tight fluid connection with the elbow 44.

Assuming the vessel is being unloaded, as the weight thereof decreases, the vessel, and correspondingly the manifold coupling 46 will rise continually in the water and with respect to the dock 22. Although the series tension responsive switches 71 and 72 operate the winches 48 in a manner to accommodate a limited amount of such vertical movement, a substantial further amount of vertical adjustment is possible by movement of the conduit 28 in the mast 10. When this is desired, the valve handle 124 is adjusted to admit pressurized working fluid to the chamber 116 and exhaust fluid from the chamber 114 in the manner aforementioned, thus causing the conduit 28 to move upwardly. Such upward adjustment may continue until the platform 62 engages the upper edge of the opening 32 in the mast upper section 12. During loading operations it will be understood that movement of the vessel will be downward with respect to the dock 22 and although the series tension switches 71 and 72 will operate winch 48 in a manner to accommodate a limited amount of such vertical movement, substantial further downward movement of the conduit 28 will be brought about by proper manipulation of the valve 122.

Thus, it will be seen that by this invention there is provided an extremely effective marine loading and unloading apparatus by which the abovementioned objectives are fully accomplished. Not only does the vertical adjustability of the slidable conduit 28 within the mast 10 afford a wider range of coupling positions than in apparatus of this type heretofore available, but also, this feature enables such adaptability while enabling shorter lengths of laterally extending pipe sections thereby to permit complete support of the apparatus within a comparatively simple and uncluttered mast. Further, because the hydraulically actuated slidable conduit 28 is carried within the tubular mast 10 in a manner so as to be in firm engagement therewith at all times, which engagement is made possible by the highly effective arrangement of guideways 130 and 132 coacting with the bearings 138 and 140, the mast is materially strengthened. Yet, because of the mast being formed in three sections, maximum economy is afforded. This three section assembly greatly facilitates the mounting of the various seal structures necessary to establish the expansible chambers 114 and 116 for vertically positioning the slidable conduit 28 as described but also reduces the cost of the mast in that only the central section 14 thereof is required to be accurately finished on its interior surface to permit sliding fluid tight engagement of the seal 106 therewith.

Since many possible changes can be made in this invention, it is to be understood that the preceding description is illustrative only and not limiting, and that the true spirit and scope thereof is to be determined by the appending claims.

I claim:

1. An on-shore loading and unloading apparatus for the transmission of fluid material between a shore installation and a floating ship, said apparatus being mountable on a stable, marine structure and comprising: a substantially vertical, tubular mast having a lower section adapted to be anchored below the floor of the marine structure, and an upper section adapted to extend above the marine structure floor and having an elongated opening formed in the seaward side thereof; a slidable fluid conduit positioned within said mast, and open at its lower end to be in fluid communication with said lower section; conduit means connected to the upper portion of said slidable conduit and extending through said elongated opening to establish a fluid connection between the ship and said slidable conduit; means for adjustably supporting said conduit means from the upper end portion of said mast; bearing means supporting the upper end of said slidable conduit for vertical movement through a distance substantially equal to the length of said elongated opening; seal means for supporting the lower end of said slidable conduit throughout said movement, said seal means being disposed between the inside of said mast and the exterior of said slidable conduit to prevent the escape of fluid material from said lower mast section exteriorly of said slidable conduit; means for moving said slidable conduit vertically within said mast; and means establishing a fluid connection between said lower section and the shore installation.

2. The apparatus recited in claim 1 in which said conduit means includes: a plurality of articulated pipe sections universally adjustable with respect to said slidable conduit.

3. A loading and unloading apparatus for the transmission of fluid material between shore installations and floating ships, said apparatus being mountable on a stable marine structure and comprising: a substantially vertical, tubular mast having upper, central and lower sections, said upper section having an elongated opening formed in one side thereof; a slidable fluid conduit carried within said mast and open at its lower end to be in fluid communication with said lower section of said mast; a pair of annular seals in fluid tight, sliding engagement with said slidable fluid conduit, one of said seals being mounted on each end of said mast central section; an annular seal mounted on the exterior of said slidable conduit and in fluid tight slidable engagement with said mast central section, said last-mentioned seal defining with said pair of seals, a pair of annular, expansible chambers; means for feeding pressurized working fluid to said chambers to effect vertical movement of said slidable conduit in said mast; conduit means connected to the upper portion of said slidable conduit and extending through said elongated opening to establish fluid communication between said slidable conduit and a ship; and means for connecting said lower mast section to be in fluid communication with a shore installation.

4. The apparatus recited in claim 3 in which said upper, central and lower mast sections are formed having flanges for the interconnection thereof and in which said pair of mast mounted seals include radially projecting annular supporting rings secured between said flanges.

References Cited in the file of this patent

UNITED STATES PATENTS

| | | |
|---|---|---|
| 1,680,831 | White | Aug. 14, 1928 |
| 2,345,531 | Ganahl | Mar. 28, 1944 |
| 2,371,911 | O'Brien | Mar. 20, 1945 |
| 2,953,161 | Muller | Sept. 20, 1960 |